US012394874B1

(12) United States Patent
Hensley et al.

(10) Patent No.: US 12,394,874 B1
(45) Date of Patent: Aug. 19, 2025

(54) STRETCHABLE LIQUID METAL COAXIAL PHASE SHIFTER

(71) Applicant: UNM Rainforest Innovations, Albuquerque, NM (US)

(72) Inventors: David M. Hensley, Albuquerque, NM (US); Christos G. Christodoulou, Albuquerque, NM (US); Nathan Jackson, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 113 days.

(21) Appl. No.: 17/897,093

(22) Filed: Aug. 26, 2022

Related U.S. Application Data

(60) Provisional application No. 63/237,999, filed on Aug. 27, 2021.

(51) Int. Cl.
*H01P 1/18* (2006.01)

(52) U.S. Cl.
CPC .................................... *H01P 1/183* (2013.01)

(58) Field of Classification Search
CPC ....................................................... H01P 1/183
See application file for complete search history.

(56) References Cited

FOREIGN PATENT DOCUMENTS

CN 212675935 U * 3/2021

OTHER PUBLICATIONS

M. Wang, C. Trlica, M. R. Khan, M. D. Dickey, and J. J. Adams, "A reconfigurable liquid metal antenna driven by electrochemically controlled capillarity," *J. of App. Phys.*, 117, 194901, 2015.

A. T. Ohta, G. Shuyan, L. B. Jun, H. Wenqi, and W. A. Shiroma, in *Proceedings of 2012 IEEE International Conference on Wireless Information Technology and Systems* (*ICWITS*), 2012.

M. R. Khan, G. J. Hayes, S. Zhang, M. D. Dickey, and G. Lazzi, "A Pressure Responsive Fluidic Microstrip Open Stub Resonator Using a Liquid Metal Alloy," in *IEEE Microwave Wireless Compon. Lett.*, vol. 22, No. 11, pp. 577-579, Nov. 2012, doi: 10.1109/LMWC.2012.2223754.

M. Li and N. Behdad, "Fluidically Tunable Frequency Selective/Phase Shifting Surfaces for High-Power Microwave Applications," *IEEE Trans. Antennas Propag.*, vol. 60, No. 6, pp. 2748-2759, Jun. 2012, doi: 10.1109/TAP.2012.2194645.

A. M. Morishita, C. K. Y. Kitamura, A. T. Ohta, and W. A. Shiroma, "A liquid-metal monopole array with tunable frequency, gain, and beam steering," *IEEE Antennas Wireless Propag. Lett.*, vol. 12, pp. 1388-1391, 2013.

X. Bai, M. Su, Y. Liu, and Y. Wu, "Wideband Pattern-Reconfigurable Cone Antenna Employing Liquid-Metal Reflectors," *IEEE Antennas Wireless Propag. Lett.*, vol. 17, No. 5, pp. 916-919, May 2018, doi: 10.1109/LAWP.2018.2823301.

(Continued)

*Primary Examiner* — Andrea Lindgren Baltzell
*Assistant Examiner* — Kimberly E Glenn
(74) *Attorney, Agent, or Firm* — Keith Vogt, Ltd.; Keith A. Vogt

(57) ABSTRACT

A stretchable liquid metal coaxial phase shifter comprising opposingly located attachment disks which are attached to opposingly located shield interface rings which are open ended cylinders defining an interior space and exterior surface.

18 Claims, 5 Drawing Sheets

(56) References Cited

OTHER PUBLICATIONS

L. Song, W. Gao, C. O. Chui, and Y. Rahmat-Samii, "Wideband frequency reconfigurable patch antenna with switchable slots based on liquid metal and 3-D printed microfluidics," *IEEE Antennas Wireless Propag. Lett.*, vol. 67, No. 5, pp. 2866-2895, 2019.

A. Dey, R. Guldiken, and G. Mumcu, in *Proceedings of the IEEE Antennas and Propagation Society International Symposium* (*APS/URSI*), 2013, p. 392.

D. Kim, R. G. Pierce, R. Henderson, S. J. Doo, K. Yoo, and J.-B. Lee, "Liquid metal actuation-based reversible frequency tunable monopole antenna," *Appl. Phys. Lett.*, vol. 105, No. 23, 234104, Dec. 2014.

N. Jackson, J. Buckley, C. Clarke, and F. Stam, "Manufacturing methods of stretchable liquid metal-based antenna," *Microsyst. Technol.*, vol. 25, pp. 3175-3184, 2019.

M. Kubo, et al., "Stretchable Microfluidic Radiofrequency Antennas," *Adv. Mater.*, vol. 22, No. 25, pp. 2749-2752, Jul. 2010, doi: 10.1002/adma.200904201.

L. Teng, K. Pan, M. P. Nemitz, R. Song, Z. Hu, and A. A. Stokes, "Soft Radio-Frequency Identification Sensors: Wireless Long-Range Strain Sensor Using Radio Frequency Identification," *Soft Robotics*, vol. 6, No. 1, pp. 82-94, Feb. 2019.

M. D. Dickey, "Emerging applications of liquid metals featuring surface oxides," *ACS Appl. Mat. Interfaces*, vol. 6, No. 21, pp. 18369-18379, 2014.

Y-L. Park, C. Majidi, R. Kramer, P. Bérard, and R. J. Wood, "Hyperelastic pressure sensing with a liquid-embedded elastomer," *J. of Micromech. Microeng.*, vol. 20, No. 12, 125029, 2010.

N. Lazarus, C. D. Meyer, S. S. Bedair, H. Nochetto, and I. M. Kierzewski, "Multilayer liquid metal stretchable inductors," *Smart Mat. Struc.*, vol. 23, 085036, 2014.

S. W. Jin, et al., "Stretchable loudspeaker using liquid metal microchannel," *Sci. Rep.*, vol. 5, No. 11695, 2015.

Wang, Y. Yu, and J. Liu, "Preparations, Characteristics and Applications of the Functional Liquid Metal Materials," *Adv. Eng. Mater.*, vol. 20, No. 5, pp. (1700781) 1-21, May 2018, doi: 10.1002/adem.201700781.

D. Zhang and Y. Rahmat-Samii, "Top-cross-loop improving the performance of the UWB planar monopole antennas," *Microw. Opt. Technol. Lett.*, vol. 59, No. 10, pp. 2432-2440, Oct. 2017.

P. S. Hall, P. Gardner, and A. Faraone, "Antenna requirements for software defined and cognitive radios," *Proc. IEEE*, vol. 100, No. 7, pp. 2262-2270, Jul. 2012.

J. M. Kovitz, H. Rajagopalan, and Y. Rahmat-Samii, "Design and implementation of broadband MEMS RHCP/LHCP reconfigurable arrays using rotated E-shaped patch elements," *IEEE Trans. Antennas Propag.*, vol. 63, No. 6, pp. 2497-2507, Jun. 2015.

A. Mansoul, F. Ghanem, M. R. Hamid, and M. Trabelsi, "A selective frequency-reconfigurable antenna for cognitive radio applications," *IEEE Antennas Wireless Propag. Lett.*, vol. 13, pp. 515-518, 2014.

N. Behdad and K. Sarabandi, "Dual-band reconfigurable antenna with a very wide tunability range," *IEEE Trans. Antennas Propag.*, vol. 54, No. 2, pp. 409-416, Feb. 2006.

H. Li, J. Xiong, Y. Yu, and S. He, "A simple compact reconfigurable slot antenna with a very wide tuning range," *IEEE Trans. Antennas Propag.*, vol. 58, No. 11, pp. 3725-3728, Nov. 2010.

C. Koo, B. E. LeBlanc, M. Kelley, H. E. Fitzgerald, G. H. Huff, and A. Han, "Manipulating liquid metal droplets in microfluidic channels with minimized skin residues toward tunable RF applications," *J. Microelectromech. Syst.*, vol. 24, No. 4, pp. 1069-1076, Aug. 2015.

H. Zhu, S. Cheung, and T. Yuk, "Mechanically pattern reconfigurable antenna using metasurface," *Proc. IET Microw Antennas Propag.*, vol. 9, pp. 1331-1336, 2015.

J. Row and C. Tsai, "Pattern reconfigurable antenna array with circular polarization," *IEEE Trans. Antennas Propag.*, vol. 64, No. 4, pp. 1525-1530, Apr. 2016.

Y. Bai, S. Xiao, C. Liu, X. Shuai, and B. Wang, "Design of pattern reconfigurable antennas based on a two-element dipole array model," *IEEE Trans. Antennas Propag.*, vol. 61, No. 9, pp. 4867-4871, Sep. 2013.

S. Shi and W. Ding, "Radiation pattern reconfigurable microstrip antenna for WiMAX application," *Electron. Lett.*, vol. 51, No. 9, pp. 662-664, Apr. 2015.

S. Mahmood and T. Denidni, "Pattern-reconfigurable antenna using a switchable frequency selective surface with improved bandwidth," *IEEE Antennas Wireless Propag. Lett.*, vol. 15, pp. 1148-1151, 2016.

G. J. Hayes, S. C. Desai, Y. Liu, P. Annamaa, G. Lazzi, and M. D. Dickey, "Microfluidic Coaxial Transmission Line and Phase Shifter," *Microwave Opt. Technol. Lett.*, vol. 56, No. 6, pp. 1459-1462, Jun. 6, 2014, doi: 10.1002/mop.

Government of Canada. "History of mercury." Canada.ca. https://www.canada.ca/en/environment-climate-change/services/pollutants/mercury-environment/about/history.html (accessed Jul. 23, 2020).

A. Yuhas. "Liquid mercury found under Mexican pyramid could lead to king's tomb." Theguardian.com. https://www.theguardian.com/world/2015/apr/24/liquid-mercury-mexican-pyramid-teotihuacan (accessed Jul. 23, 2020).

G. Bjørklund, "The history of dental amalgam (in Norwegian)," *Tidsskr nor Laegeforen*, vol. 109, pp. (34-36): 3582-3585, 1989, PMID 2694433 abstract only.

A. Czarnetzki, S. Ehrhardt, "Re-dating the Chinese amalgam-filling of teeth in Europe," *International Journal of Anthropology*, vol. 5, No. 4, pp. 325-332, 1990.

U.S. Food & Drug Administration. "About Dental Amalgam Fillings." Fda.gov. https://www.fda.gov/medical-devices/dental-amalgam/about-dental-amalgam- fillings (accessed Jul. 23, 2020.

European Commission. "Environment: Mercury regulation." Ec.europa.eu. https://ec.europa.eu/environment/chemicals/mercury/regulation_en.htm (accessed Jul. 23, 2020.

Wikipedia. "Mercury-vapor lamp." En.wikipedia.org. https://en.wikipedia.org/wiki/Mercury-vapor_lamp (accessed Jul. 23, 2020).

Wikipedia. "Fluorescent lamp." En.wikipedia.org https://en.wikipedia.org/wiki/Fluorescent_lamp (accessed Jul. 23, 2020.

C. R. Hammond, "The Elements," in *CRC Handbook of Chemistry and Physics*, 86th ed., Boca Raton, FL, USA: CRC Press, 2005.

Wikipedia. "Mercury (element)." En.wikipedia.org. https://en.wikipedia.org/wiki/Mercury_(element) (accessed Jul. 24, 2020.

F. Kreith and G. Tchobanoglous, *Handbook of solid waste management*, McGraw- Hill Professional, 2002, pp. 6-34.

Wikipedia. "Mercury switch." En.wikipedia.org. https://en.wikipedia.org/wiki/Mercury_switch (accessed Jul. 24, 2020).

E. Werndl, "Antenna tunable in its length," U.S. Pat. No. 2,278,601, Apr. 7, 1942.

T. Gray, N. Mann, and M. Whitby. "Technical data for Mercury." Periodictable.com. https://periodictable.com/Elements/080/data.html (accessed Jul. 29, 2020.

T. Liu, P. Sen, and C. Kim, "Characterization of Nontoxic Liquid-Metal Alloy Galinstan for Applications in Microdevices," *in Journal of Micromechanical Systems*, vol. 21, No. 2, pp. 443-450, Apr. 2012.

United States Environmental Protection Agency (EPA). "Mercury: Common exposures to mercury." Epa.gov. https://www.epa.gov/mercury/basic-information- about-mercury#exposures (accessed Jul. 27, 2020.

United States Environmental Protection Agency (EPA). "Mercury: Mercury thermometers." Epa.gov. https://www.epa.gov/mercury/mercury-thermometers (accessed Jul. 27, 2020).

A. M. Helmenstine. "Have You Touched Liquid Mercury." ThoughtCo.com. https://www.thoughtco.com/when-you-touch-liquid-mercury-609286 (accessed Jul. 27, 2020).

City-Data. "Playing with mercury as a child." City-data.com. https://www.city-data.com/forum/health-wellness/558626-playing-mercury-child-2.html (accessed Jul. 27, 2020).

United States Environmental Protection Agency (EPA). "Mercury: Health Effects of Exposure to Mercury." Epa.gov. https://www.epa.gov/mercury/health-effects- exposures-mercury#self (accessed Jul. 27, 2020).

(56) References Cited

OTHER PUBLICATIONS

United States Environmental Protection Agency (EPA). "Mercury: Exposures to Elemental (Metallic) Mercury." Epa.gov. https://www.epa.gov/mercury/how- people-are-exposed-mercury#metallicmercury (accessed Jul. 27, 2020.
Agency for Toxic Substances & Disease Registry. "Toxic Substances Portal—Mercury." Atsdr.cdc.gov. https://www.atsdr.cdc.gov/toxfaqs/tf.asp?id=113&tid=24 (accessed Jul. 27, 2020.
L. C. Price and D. M. Price, "Indonesia: Mercury, Gold, and 'Uncommon Diseases'." Pulitzercenter.org. https://pulitzercenter.org/reporting/indonesia- mercury-gold-and-uncommon-diseases (accessed Jul. 27, 2020.
United States Environmental Protection Agency (EPA). "International Cooperation: Minimata Convention on Mercury." Epa.gov. https://www.epa.gov/international- cooperation/minamata- convention-mercury (accessed Jul. 27, 2020.
Wikipedia. "Gallium." En.wikipedia.com. https://en.wikipedia.org/wiki/Gallium (accessed Jul. 27, 2020.
M. Alt, email communication, *Geratherm Medical AG*, Jan. 13, 2020. Webpage only.
Geratherm Medical AG. Galinstan R Safety Data sheet (revision: Mar. 18, 2004). Geratherm.com .; revised Sep. 14, 2006, retrieved from https: //www.google.com/url?sa=t&rct=|&q=&esrc=s&source=web&cd=&cad=ria&uact=8&ved= 2ahUKEwi58cSMx8z5AhUfKOOIHU3iB70OFnoECAgQAQ&url=http%3A 62F%2Fbaisd- mi.safeschoolssds.com%2Fdocument%2Frepo%2F445ac403-dce0-428a-9541- c07daac255bc&nsg=AOyVaw3NIX98Rewo728CRuWVgSiZ.
Geratherm Medical AG. Galinstan ® Safety Data Sheet (revision: Sep. 23, 2009). Geratherm.com. http://www.geratherm.com/wp-content/uploads/2010/02/Safety- Data-Sheet-Galinstan-2010-EN.pdf (accessed May 15, 2020.
J. Naber, "Digital GaAs integrated circuits," in *Gallium Arsenide IC Applications Handbook*, D. Fisher, I. Bahl. Eds., vol. 1, San Diego, CA, USA: Academic Press, 1995, ch. 3, pp. 60-61.
Wikipedia. "Gallium arsenide." En.wikipedia.com. https://en.wikipedia.org/wiki/Gallium_arsenide (accessed Jul. 28, 2020.
K. Ahi, "Review of GaN-based devices for terahertz operation," in *Optical Engineering*, vol. 56, No. 9, pp. 1-14, Sep. 2017, doi: 10.1117/1.OE.56.9.090901.
Wikipedia. "Gallium nitride." En.wikipedia.com https://en.wikipedia.org/wiki/Gallium_nitride (accessed Jul. 28, 2020.
A. Lidow, J. B. Witcher, and K. Smalley, "Enhancement Mode Gallium Nitride (eGaN) FET Characteristics under Long Term Stress," *GOMAC Tech Conference*, Mar. 2011.
M. D. Dickey, R. C. Chiechi, R. J. Larsen, E. A. Weiss, D. A. Weitz, and G. M. Whitesides, "Eutectic Gallium-Indium (EGaIn): A Liquid Metal Alloy for the Formation of Stable Structures in Microchannels at Room Temperature," *Adv. Funct. Mater.*, vol. 18, No. 7, pp. 1097-1104, Apr. 2008.
Wikipedia. "Galinstan." En.wikipedia.com. https:/ /en.wikipedia.org/wiki/Galinstan (accessed Jul. 28, 2020).
Goodfellow Corporation. "Gallium/Indium/Tin (Ga68.5/IN21.5/Sn10) Material Information," Goodfellow.com. http://www.goodfellow.com/E/Gallium-Indium- Tin-Alloy.html (accessed Jul. 29, 2020)—not available; https://www.goodfellow.co.kr/en/product/gallium-indium-tin-lump-GA056100.htm retrieved Aug. 6, 2022.—webpage only.
American Elements. "Gallium Indium Tin Alloy." Americanelements.com. https://www.americanelements.com/gallium-indium-tin-alloy (accessed Jul. 29, 2020.
RotoMetals. "Low Melting Point Alloy Galinstan—68.5% Ga, 21.5% In, 10% Sn -50 Grams," Rotometals.com. https://www.rotometals.com/low-melting-point-alloy-galinstan-68-5-ga-21- 5-in-10-sn-50-grams/ (accessed Jul. 29, 2020.
C. Karcher, V. Kocourek, and D. Schulze, "Experimental Investigations of Electromagnetic Instabilities of Free Surfaces in a Liquid Metal Drop," in *Int. Scientific Colloq.—Modelling for Electromagnetic Processing*, Hannover, Germany, Mar. 24-26, 2003.
U.S. Food & Drug Administration. "FDA approves new diagnostic imaging agent to detect rare neuroendocrine tumors." Fda.gov. https://www.fda.gov/news- events/press- announcements/fda-approves-new-diagnostic-imaging-agent-detect-rare-neuroendocrine-tumors (accessed Jul. 30, 2020.
C. Ivanoff, A. E. Ivanoff, and T. L. Hottel, "Gallium poisoning: A rare case report," in *Food and Chemical Toxicology*, vol. 50, No. 2, pp. 212-215, Feb. 2012, https://doi.org/10.1016/j.fct.2011.10.041.
T. Gray, N. Mann, and M. Whitby. "Technical data for Gallium." Periodictable.com. https://periodictable.com/Elements/031/data.html (accessed Jul. 29, 2020.
M. Han, X. Zhang, and H. Zhang, Eds., "Characterization of triboelectric nanogenerators," in *Flexible and Stretchable Triboelectric Nanogenerator Devices: Toward Self-powered Systems*, Weinheim, Germany: Wiley-VCH, 2019, ch. 4, p. 70.
J. N. Koster, "Directional Solidification and Melting of Eutectic Galn," *Cryst. Res. Technol.*, vol. 34, No. 9, pp. 1129-1140, 1999.
S. Yu and M. Kaviany, "Electrical thermal, and species transport properties ofliquid eutectic Ga—In and Ga—In—Sn from first principles," *J. Chem. Phys.*, vol. 140, No. 064303, pp. 1-8, Feb. 2014, https://doi.org/10.1063/1.4865105.
X. Liu, L. P. B. Katehi and D. Peroulis, "Non-toxic liquid metal microstrip resonators," *2009 Asia Pacific Microwave Conference*, Singapore, pp. 131-134, doi: 10.1109/APMC.2009.5385336.
M. J. Regan, et al., "X-ray study of the oxidation of liquid-gallium surfaces," in *Phys. Rev. B*, vol. 55, No. 16, pp. 10786-10790, Apr. 1997.
P. A. Giguère and D. Lamontagne, "Polarography with a Dropping Gallium Electrode," *Science*, vol. 120, No. 3114, pp. 390-391, Sep. 1954.
J. Wissman, T. Lu and C. Majidi, "Soft-Matter Electronics with Stencil Lithography," *Sensors, 2013, IEEE*, Baltimore, MD. 2013, pp. 1-4, doi: 10.1109/ICSENS.2013.6688217.
A. Tabatabai, A. Fassler, C. Usiak, and C. Majidi, "Liquid-Phase Gallium-Indium Alloy Electronics with Microcontact Printing," *Langmuir*, vol. 29, No. 20, pp. 6194-6200, Apr. 2013.
Y. Zheng, Z. He, Y. Gao, and J. Liu, "Direct Desktop Printed-Circuits-on-Paper Flexible Electronics," *Sci. Rep.*, vol. 3, No. 1786, May 2013.
C. Ladd, J-H. So, J. Muth, and M. D. Dickey, "3D Printing of Free Standing Liquid Metal Microstructures," *Adv. Mater.*, vol. 25, No. 36, pp. 5081-5085, Sep. 2013.
E. Palleau, S. Reece, S. C. Desai, M. E. Smith, and M. D. Dickey, "Self-Healing Stretchable Wires for Reconfigurable Circuit Wiring and 3D Microfluidics," *Adv. Mater.*, vol. 25, No. 11, pp. 1589-1592, Mar. 2013.
P. Codier, F. Tournilhac, C. Soulié-Ziakovic, and L. Leibler, "Self-Healing and Thermoreversible Rubber from Supramolecular Assembly," *Nature*, vol. 451, pp. 977-980, Feb. 2008.
V. Ya. Prokhorenko, V. V. Roshchupkin, M. A. Pokrasin, S. V. Prokhorenko, and V. V. Kotov, "Liquid Gallium: Potential Uses as a Heat-Transfer Agent," *High Temperature*, vol. 38, No. 6, pp. 954-968, 2000.
X. Wang, and J. Liu, "Recent Advancements in Liquid Metal Flexible Printed Electronics: Properties, Technologies, and Applications," *Micromachines*, vol. 7, No. 206, pp. 1-24, 2016, doi:10.3390/mi7120206.
Smooth-On. Technical Bulletin-Ecoflex.™Series. Smooth-on.com. https://www.smooth-on.com/tb/files/ECOFLEX_SERIES_TB.pdf (accessed: May 15, 2020).
H. Fallahi, J. Zhang, H-P. Phan, and N-T. Nguyen, "Flexible Microfluidics: Fundamentals, Recent Developments, and Applications," *Micromachines*, vol. 10, No. 830, Nov. 2019, doi: 10.3390/mi10120830.
P. Boonvisut and M. C. Çavuşoğlu, "Estimation of Soft Tissue Mechanical Parameters From Robotic Manipulation Data," *IEEE/ASME Trans. Mechatronics*, vol. 18, No. 5, pp. 1602-1611, Oct. 2013, doi: 10.1109/TMECH.2012.2209673.
MatWeb: Material Property Data. "Overview of materials for Silicone Rubber." Matweb.com. http://www.matweb.com/search/DataSheet.aspx?MatGUID=cbe7a469897a47eda563816c86a73520 (accessed: Jul. 15, 2020).

(56) References Cited

OTHER PUBLICATIONS

AZO Materials. "Silicone Rubber." Azom.com. https://www.azom.com/properties.aspx?ArticleID=920 (accessed Jul. 15, 2020).
The Engineering ToolBox. "Poisson ratio." Engineeringtoolbox.com. https://www.engineeringtoolbox.com/poissons-ratio-d_1224.html (accessed: Jul. 15, 2020).
M. L. Anderson, P. H. Mott, and C. M. Roland, "The Compression of Rubber Bonded Disks," *Rubber Chem. Technol*. vol. 77, No. 2, pp. 293-302, 2004.
R. J. Schaefer, "Chapter 33: Mechanical Properties of Rubber," in *Harris' Shock and Vibration Handbook*, New York, NY: McGraw-Hill, 2003.
S. Eom, and S. Lim, "Stretchable Complementary Split Ring Resonator (CSRR)- Based Radio Frequency (RF) Sensor for Strain Direction and Level Detection," *Sensors*, vol. 16(10), No. 1667, pp. 1-12, Oct. 2016, doi: 10.3390/s16101667.
C. T. Tai, S. A. Long, "Dipoles and monopoles," in *Antenna Engineering Handbook*, R. C. Johnson, Ed., 3rd ed., New York, NY, USA: McGraw-Hill, 1993, ch. 4, pp. 4-5, 26-28.
W. L. Stutzman and G. A. Theile, "Some simple radiating systems and antenna practice," in *Antenna Theory and Design*, 2nd ed., New York, NY, USA: John Wiley & Sons, 1998, ch. 2, pp. 68.
W. L. Stutzman and G. A. Theile, "Some simple radiating systems and antenna practice," in *Antenna Theory and Design*, 2nd ed., New York, NY, USA: John Wiley & Sons, 1998, ch. 2, pp. 79-80.
C. A. Balanis, "Arrays: Linear, Planar, and Circular," in *Antenna Theory: Analysis and Design*, 3rd ed. Hoboken, NJ, USA, John Wiley & Sons, 2005, ch. 6, sec. 6.3, pp. 290-304.
W. L. Stutzman and G. A. Thiele, "Arrays," in *Antenna Theory and Design*, 2nd ed. New York, NY, USA, John Wiley & Sons, 1998, ch. 3, sec. 3.1-3.2, pp. 95, 99-106.
Hensley, A Stretchable Liquid Metal Coaxial Phase Shifter; Antennas and Propagation; vol. 2, 2021; IEEE; US.

* cited by examiner

STRETCHABLE LIQUID METAL COAXIAL PHASE SHIFTER

RELATED APPLICATIONS

This application claims priority to U.S. Provisional Application No. 63/237,999, filed on Aug. 27, 2021, which is incorporated herein in its entirety.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

Liquid metals are not new to electronics with patents for reconfigurable liquid metal antennas dating back as far as 1942. However, the non-toxicity of gallium based liquid metals such as Galinstan and EGaIn have helped to drive a resurgence of studies for their applications in the last 10-15 years. A few of these applications consist of reconfigurable antennas, strain and pressure sensors, inductors, and phase shifters. In other designs, the design consisted of a liquid metal center conductor encased in an elastic polymer and surrounded by a shield consisting of five hand-woven liquid metal strands also encased in the elastic polymer. While the design was a good proof of concept, it suffered from transverse electromagnetic (TEM) breakdown at high frequencies. This caused increased transmission loss above 2 GHz.

BRIEF SUMMARY OF THE INVENTION

In one aspect, the embodiments of the present invention reduce the high frequency transmission losses suffered by the prior designs by modifying the hand-woven shield to a hollow cylinder style shield that has a solid surface which is nonwoven with no gaps in the surface area. By using a solid shield rather than a mesh or woven shield, gaps in the shield are reduced or eliminated which in turn reduce the TEM breakdown at high frequencies and increase the operational frequencies of the phase shifter.

In other embodiments, the present invention concerns a stretchable liquid metal coaxial phase shifter constructed of a liquid metal center conductor, a liquid metal shield in the shape of a hollow cylinder, and a stretchable rubber-based polymer (Ecoflex™ 00-30) which encases and insulates the liquid metal. Because the design of the shield consists of a hollow cylinder rather than woven strands, TEM breakdown at high frequencies is decreased, and the phase shifter improves its transmission and reflection coefficients at higher frequencies. Results show a transmission coefficient ($S_{21}$) better than −1.8 dB and a reflection coefficient ($S_{11}$) better than −10 dB with a 40 mm stretch (62%) and a frequency band of 1 GHz to 4 GHz.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Figure 1:
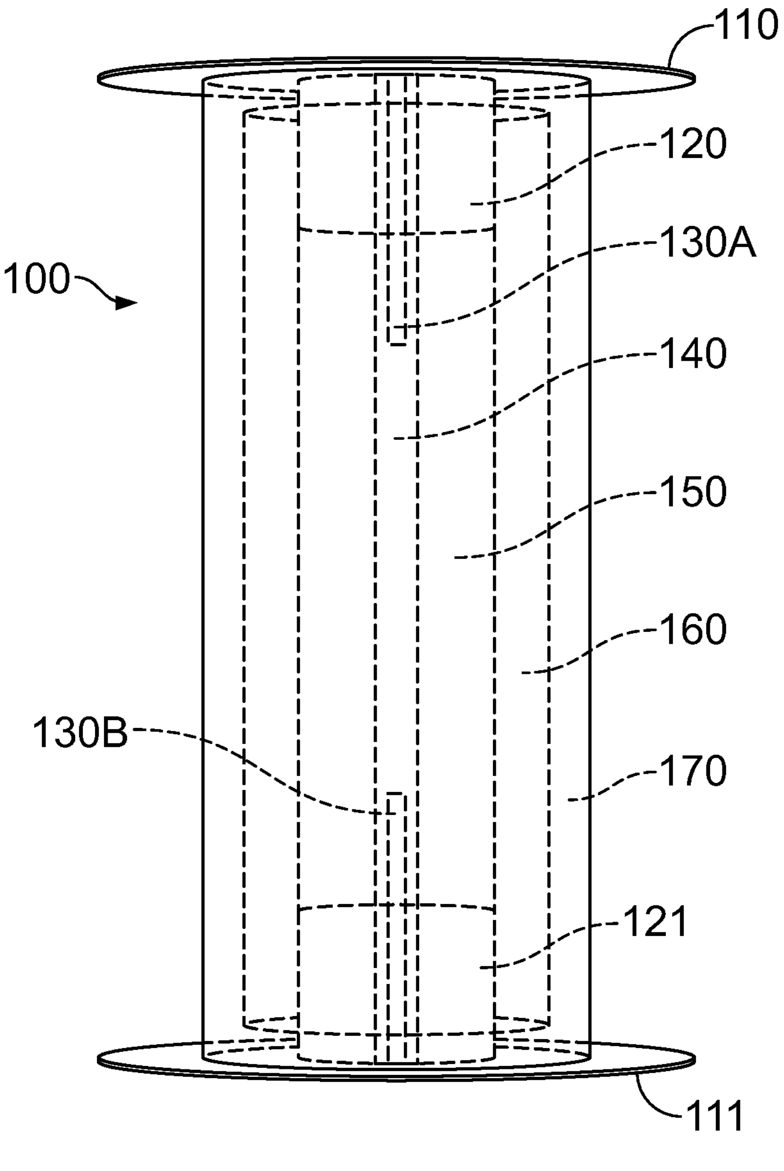
FIG. 1 illustrates an embodiment of the present invention.

Detailed embodiments of the present invention are disclosed herein; however, it is to be understood that the disclosed embodiments are merely exemplary of the invention, which may be embodied in various forms.

Therefore, specific structural and functional details disclosed herein are not to be interpreted as limiting, but merely as a representative basis for teaching one skilled in the art to variously employ the present invention in virtually any appropriately detailed method, structure, or system. Further, the terms and phrases used herein are not intended to be limiting, but rather to provide an understandable description of the invention.

Design Considerations

When designing a coaxial transmission line for a specific characteristic impedance (Z0), the factors for which one has control consist of the radius of the center conductor (a), the inner radius of the shield (b), and the permittivity (ε) and permeability (μ) of the dielectric material between the conductors, as shown in (1).

$$Z_0 = \sqrt{\frac{\mu}{\varepsilon}}\frac{\ln(b/a)}{2\pi} \tag{1}$$

If the relative permeability ($U_r$) of the dielectric is 1, as in many dielectric insulators, then the factors of control reduce to the radii of the conductors (a and b) and the relative permittivity ($\varepsilon_r$). Therefore, by selecting the radii of the conductors (a and b) for a given relative permittivity ($\varepsilon_r$), one can design a 50Ω coaxial transmission line.

Given that the dielectric material is the elastic polymer which encases both the center conductor and shield, it is important to understand the effect stretching has on the radii of the encased liquid metals and in turn, the characteristic impedance. As seen from (1), if the ratio (b/a) of the conductors' radii changes when stretched, the characteristic impedance will also change. Fortunately, for a coax design both the radius of the center conductor and the radius of the shield will change at the same percentage when stretched. This equates to the ratio of the two radii staying constant over the stretch and subsequently, a constant characteristic impedance. This effect is due to the Poisson ratio (v) of the elastic polymer for both the center conductor and shield being the same.

With the Poisson ratio [negative transverse strain ($-\varepsilon_T$) over the longitudinal strain ($\varepsilon_L$) for the shield ($v_b$) and center conductor ($v_a$) being equal, the ratio of the radius of the stretched shield ($b_s$) to the radius of the stretched center conductor ($a_s$)) can be mathematically derived as equivalent to the ratio of the radius of the unstretched shield ($b_0$)) to the radius of the unstretched center conductor ($a_0$), as shown below where ($L_s$) and ($L_0$) are the stretched and unstretched lengths of the phase shifter. These ratios ($b_s/a_s$ and $b_0/a_0$) being equal states, per (1), that the characteristic impedance will stay constant when the coaxial phase shifter is stretched.

$$v_a = \frac{-\varepsilon_T}{\varepsilon_L} = \frac{-\left(\frac{a_3 - a_0}{a_0}\right)}{\frac{L_3 - L_0}{L_0}} = \frac{-\left(\frac{b_3 - b_0}{b_0}\right)}{\frac{L_3 - L_0}{L_0}} = v_b \tag{2}$$

$$\frac{a_s - a_0}{a_0} = \frac{b_s - b_0}{b_0} \tag{3}$$

$$\frac{a_s}{a_0} - 1 = \frac{b_s}{b_0} - 1 \tag{4}$$

$$\frac{a_s}{a_0} = \frac{b_s}{b_0} \tag{5}$$

$$\frac{b_0}{a_0} = \frac{b_s}{a_s}. \tag{6}$$

Construction

Figure 3:
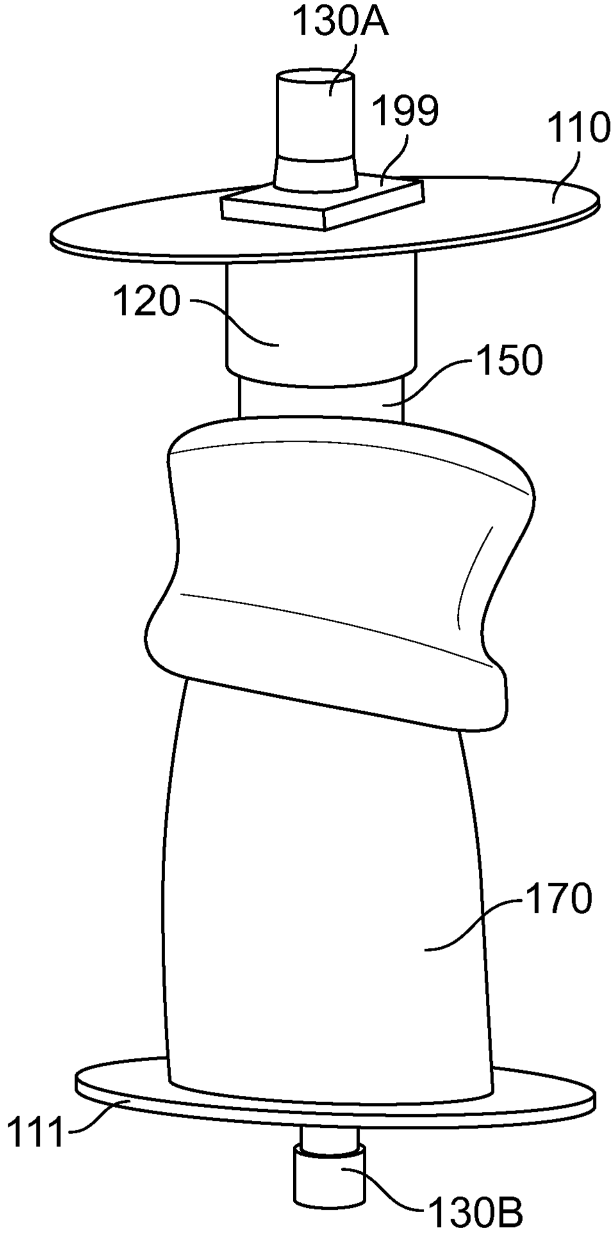
FIG. 3 illustrates another embodiment of the present invention.

FIGS. 1 and 3 illustrate an embodiment of the present invention. As shown, the present invention provides a stretchable liquid metal coaxial phase shifter 100 comprising opposingly located attachment disks 110 and 111 which are attached to opposingly located shield interface rings 120 and 121 which are open ended cylinders defining an interior space and exterior surface. Located centrally inside rings 120 and 121 is center pin 130 having terminal ends connected to disks 110 and 111. Liquid metal center conductor 140 is also centrally located inside rings 120 and 121. Surrounding and enclosing center pin 130 and liquid metal center conductor 140 is stretchable, elastic polymer layer 150 which is also located inside rings 120 and 121. Elastic polymer layer 150 defines a container in which center pin 130 and liquid metal center conductor 140 are located.

Surrounding layer 150 and well as the outer surfaces of rings 120 and 121 is liquid metal shield 160. Surrounding liquid metal shield 160 is stretchable, elastic polymer layer 170. To function as a container for liquid metal shield 160, layer 170 is located a spaced distance from layer 150 so as to define a cylindrical space between layer 150 and layer 170. Liquid metal 160 is poured inside this space.

In a preferred embodiment, the components phase shifter 100 form a series of concentric cylinders nested within each other. For example, liquid metal center 140 is cylindrical in shape and is nested within the hollow center of cylindrical layer 150. Cylindrical layer 150, in turn is surround by the cylindrical metal shield 160, which is in turn, surrounded by cylindrical layer 170. In yet another embodiment, the present invention provides: a liquid metal center conductor which is surrounded and encased within a first stretchable polymer layer which insulates the liquid metal center conductor; a liquid metal shield which surrounds and encases the first stretchable polymer layer and a second stretchable polymer layer that surrounds and encases the liquid metal shield.

Figure 5:
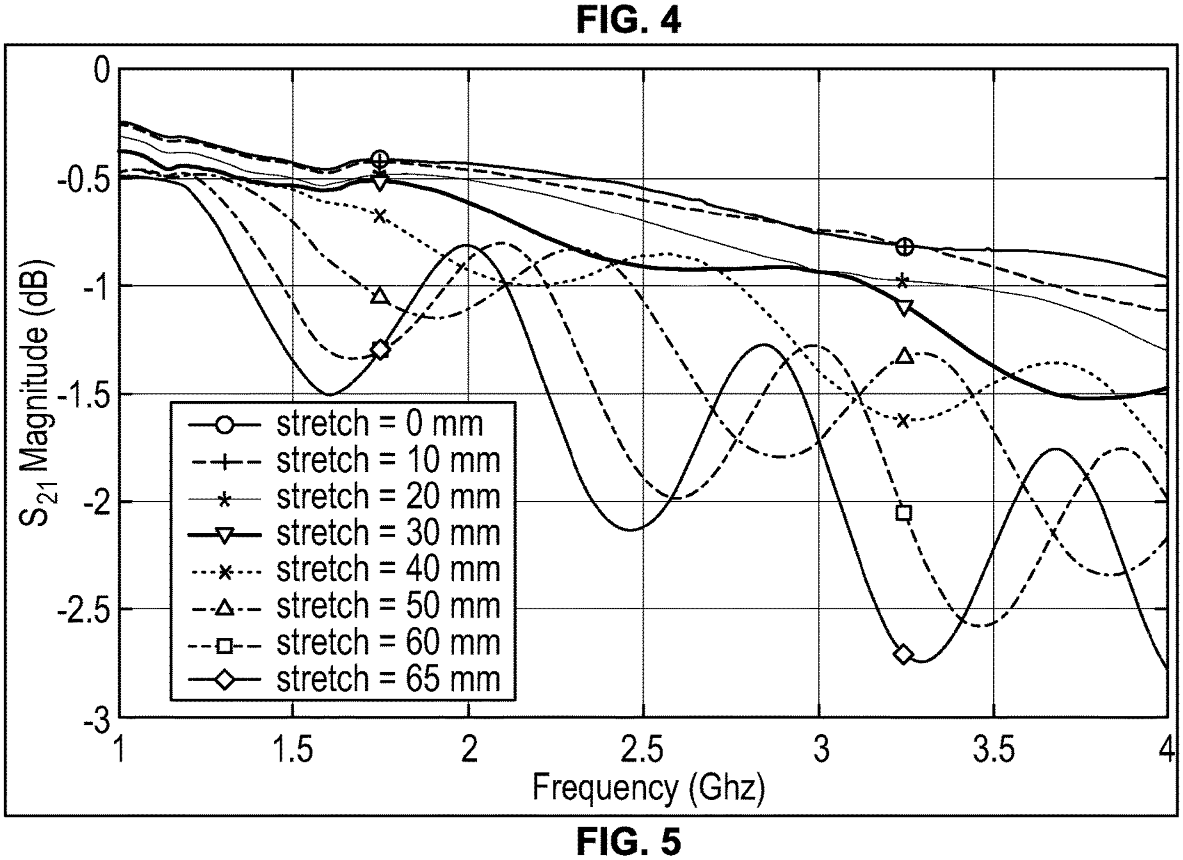
FIG. 5 shows the magnitude of the transmission coefficient ($S_{21}$) for the constructed phase shifter with stretches varying from 0 mm to 65 mm. A stretch at 40 mm (the maximum stretch to maintain an $S_{11}$ better than −10 dB) shows a maximum loss of 1.8 dB.
Figure 6:
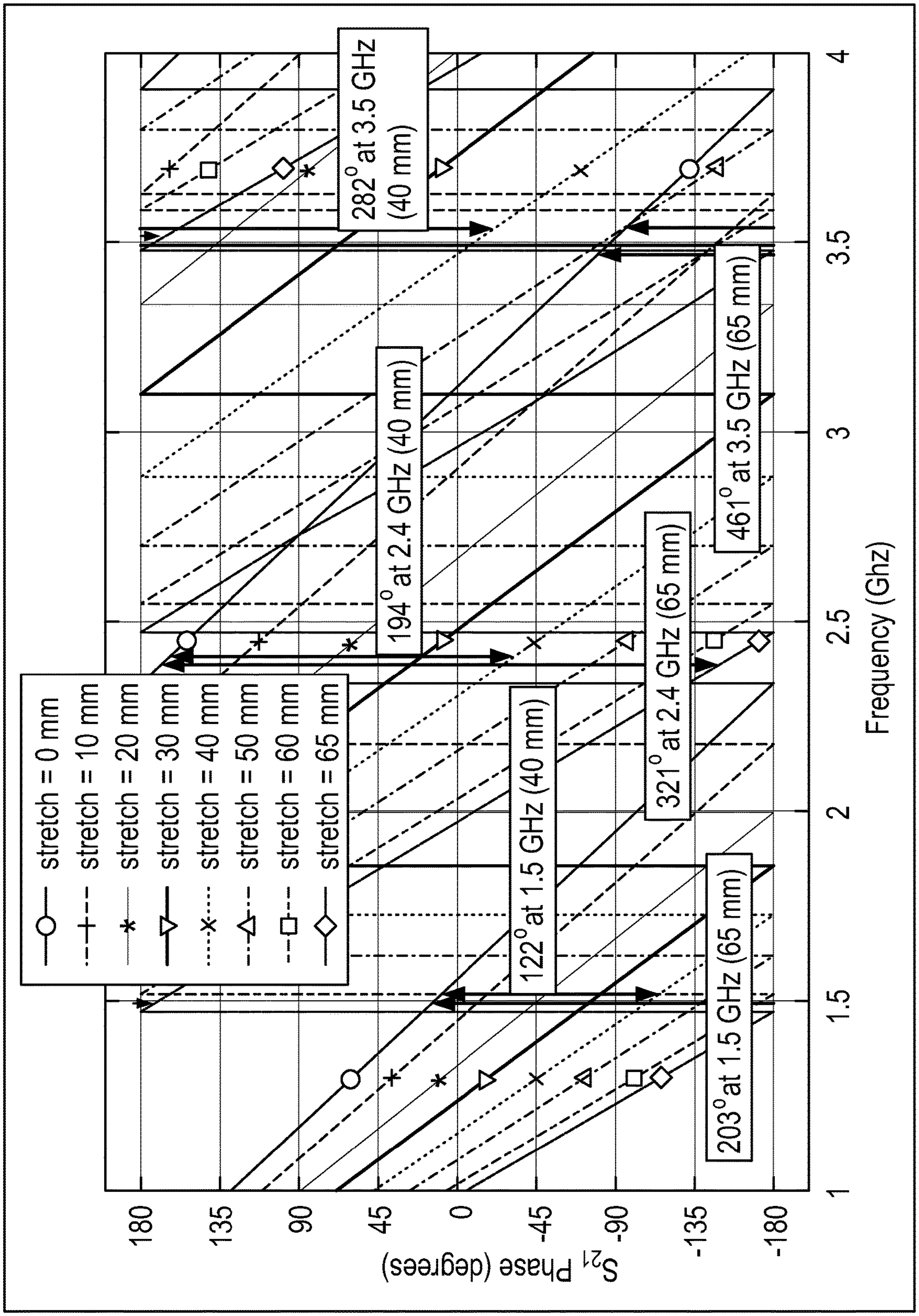
FIG. 6 shows the phase angle for the transmission coefficient ($S_{21}$) for the constructed phase shifter with stretches varying from 0 mm to 65 mm. Additionally, it shows the phase shift over 40 mm (the maximum stretch to maintain an $S_{11}$ better than −10 dB) and 65 mm (100% stretch).

In yet another embodiment, layer 160 is adapted to reduce transmission losses especially high frequency transmissions by having little or no gaps in the surface which are typically found with a mesh or woven surface. Instead, layer 160 may have a solid surface which is nonwoven with no gaps in the surface area. By using a solid shield rather than a mesh or woven shield, gaps in the outer surface of the shield are reduced or eliminated which in turn reduce the TEM breakdown at high frequencies and increase the operational frequencies of the phase shifter. As shown in FIGS. 5 and 6, providing a solid layer 160 significantly improves performance. As shown, the present invention has only a 1 dB loss with 30 mm stretch and a 2.2 dB loss with 65 mm stretch at 2.4 GHz with a 321 degree phase shift.

The main body of the phase shifter of the present invention may be constructed using a 3D printer to create molds for the layers 150 and 170 which serve as liquid metal containers, as shown in FIGS. 1 and 3. Attachment disks 110 and 111 may be copper end-disks for attaching to the top and bottom may be cut from a 0.37 mm thick copper plate. The shield-to-ground interface rings 120 and 121 may be created by cutting a small rectangle from a 0.12 mm thick copper plate, wrapping it around a properly sized wooden cylinder, and soldering it together. Because the liquid metal dissolves solder joints, the solder joint on the copper ring was wrapped and protected with copper foil tape. SMA connectors 130A and 130B may be 17 mm center conductors to ease the assembly and to ensure proper contact to the liquid metal center conductor 140 during stretching.

A single center pin makes maintaining an electrical contact during stretching problematic. Having opposing center pins 130A and 130B does not inhibit maintaining an electrical contact during stretching. When phase shifter 100 is stretched, center pin 130A is pulled away from center pin 130B. Nonetheless, both center pins maintain electrical contact with liquid metal center conductor 140 during stretching. Also, for this embodiment, center pins 130A and 130B extend through disks 110 and 111 and may be fastened to the disks by connector 199 which may be a metal plate having internal threads that mate with external threads on the pins (not shown). Affixing a one-piece center pin to the disks also inhibits stretching.

An embodiment of the present invention is further adapted to stretch from a first length having a first phase to a second length having a second phase. The second length is longer than the first length and the first phase is different than the second phase. Also, center pins 130A and 130B during stretching, maintain contact with liquid metal center conductor 140 while moving from a first position to a second position inside liquid metal center conductor 140. The pins are closer together when in the first position than when in the said second position.

Once the Ecoflex™ liquid metal containers were fully cured and removed from the molds, the liquid metal was dispensed into the containers with a pipette or syringe. The SMA connectors and shield-to-ground interface rings were also soldered onto the metal end-disks which may be copper. And lastly, superglue (cyanoacrylate ester) was used to glue everything in place and to prevent liquid metal from leaking out from the center conductor or shield. To construct the stretchable liquid metal phase shifter, a gallium-based alloy (68.5% Ga, 21.5% In, and 10% Sn), labeled as galinstan was purchased from Rotometals.

TABLE 1

Phase shifter dimensions.

| Dimension | Value |
|---|---|
| Center conductor radius | 1.5 mm |
| Shield inner-radius | 6.5 mm |
| Ecoflex ™ thickness (between conductors) | 5 mm |
| Shield thickness | 3 mm |
| Ecoflex ™ thickness (outer container) | 3 mm |
| Ecoflex ™ conductor length | 61 mm |
| Ecoflex ™ cap thickness | 2 mm |
| Overall length | 65 mm |

Medical AG with a low melting point of −19° C. (−2° F.), but an in-house mixed alloy with a melting point closer to 11° C. (52° F.) and a conductivity roughly $3.46\times10^6$ S/m. The elastic polymer used as the stretchable container of the liquid metal was Ecoflex™ 00-30 from Smooth-On. Because of its high elasticity with an elongation at break of 900%, it was a preferred choice over other materials such as polydimethylsiloxane (PDMS). Although the manufacturer did not specify the Poisson ratio of Ecoflex™, the value 0.49 was used in the simulations as 0.47 to 0.4999 is common for silicone rubbers. The elastic modulus at 100% elongation is provided as 69 kPa by Smooth-On. Additionally, the permittivity was measured to be between 3.0 and 3.2, so 3.1 was used in the simulations.

Dimensions

To create the phase shifter, a center conductor radius of 1.5 mm and shield inner radius (distance to the inside of the shield) of 6.5 mm was used. These values with an Ecoflex™ permittivity of 3.1 generate a characteristic impedance of 49.94.2. Additional dimensions for the simulation model and prototype are shown in TABLE 1.

Simulations

Simulations were completed in CST Microwave Studio using the parameter values from TABLE 1. A parameter named delta was used to represent the stretched amount. By defining the length in terms of the initial length+delta, the phase shifter achieved a simulated stretch by running a parametric sweep of delta from first length at 0 mm to second longer length which was 65 mm—representing a 100% stretch.

Another addition to the model consisted of copper disks attached to the Ecoflex™ on the top and bottom of the phase shifter. These disks served two purposes: 1. an attachment point for stretching the phase shifter, and 2. a rigid surface for attaching components to interface the liquid metal to the outside world. These components consist of an SMA connector with a long 17 mm center pin to interface to the liquid metal center conductor and a thin walled 10 mm tall metal ring, which may be copper, to interface the ground to the liquid metal shield.

Figure 2:
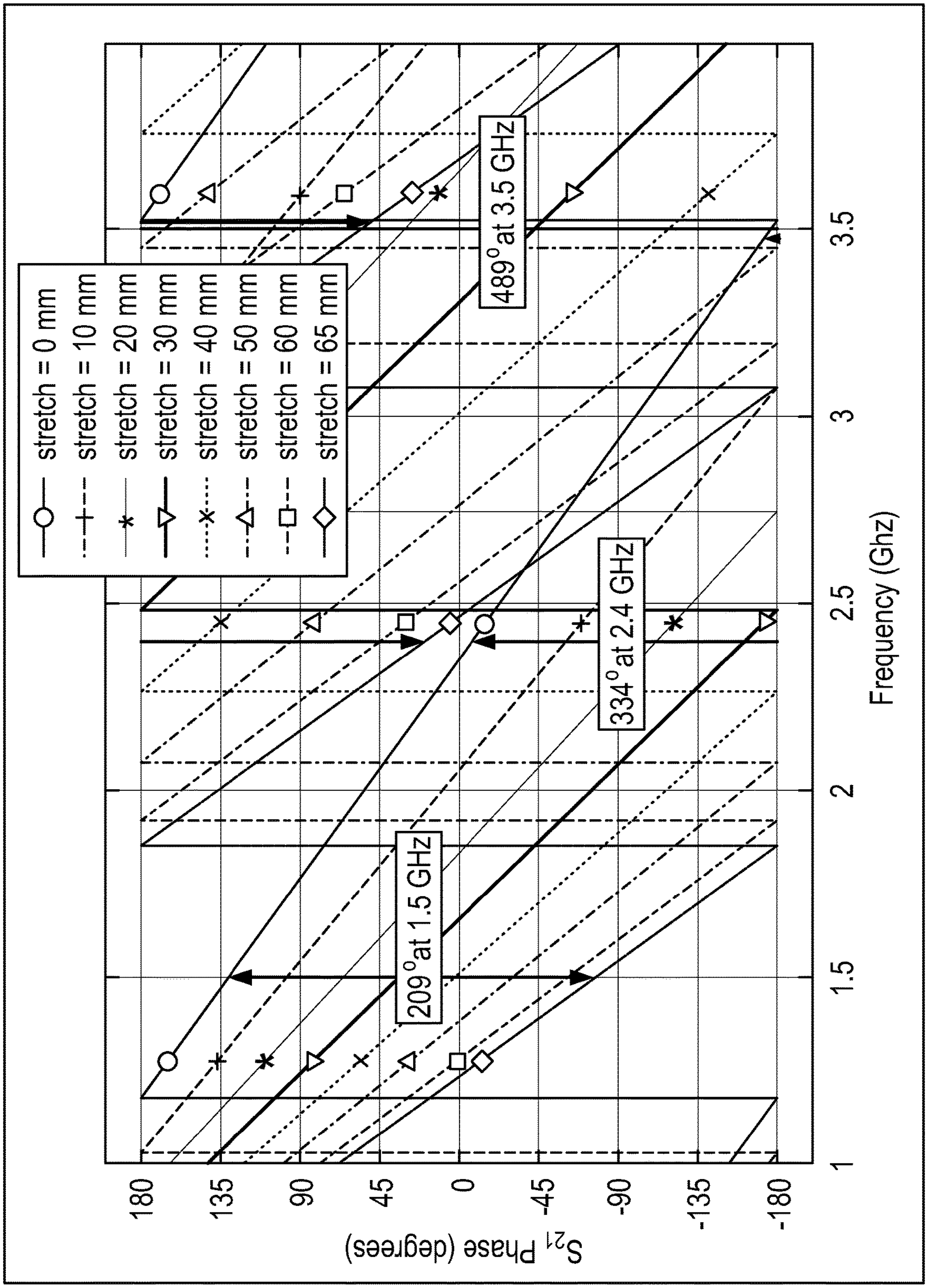
FIG. 2 shows the phase angle of the transmission coefficient ($S_{21}$) for the simulated phase shifter with delta varying from 0 mm to 65 mm. Additionally, it shows the phase shift over a 65 mm stretch at 1.5 GHZ, 2.4 GHz, and 3.5 GHZ.

The simulation results showed improvements at high frequency. Over the frequency range of 1 GHz to 4 GHz with a stretch varying up to 65 mm, simulation results show the transmission coefficient ($S_{21}$) was better than −0.26 dB and the reflection coefficient ($S_{11}$)) was better than −15 dB. Also, the phase angle of the transmission coefficient ($S_{21}$)) for stretches in 10 mm increments is shown in FIG. 2. The plot demonstrates a feasible 334° phase shift at 2.4 GHz with a 65 mm stretch which equates to about 51.4°/10 mm. Lastly, because of the constant Poisson ratio, the characteristic impedance stayed relatively constant at values between 48.8Ω and 48.9 Ω.

Measurements

The constructed phase shifter was characterized by testing it with a network analyzer to measure the magnitude of the reflection coefficient ($S_{11}$) and both the magnitude and phase of the transmission coefficient ($S_{21}$). This was done over the frequency range of 1 GHz to 4 GHz with stretches every 10 mm up to 60 mm with an additional stretch at 65 mm to represent a 100% stretch.

Figure 4:
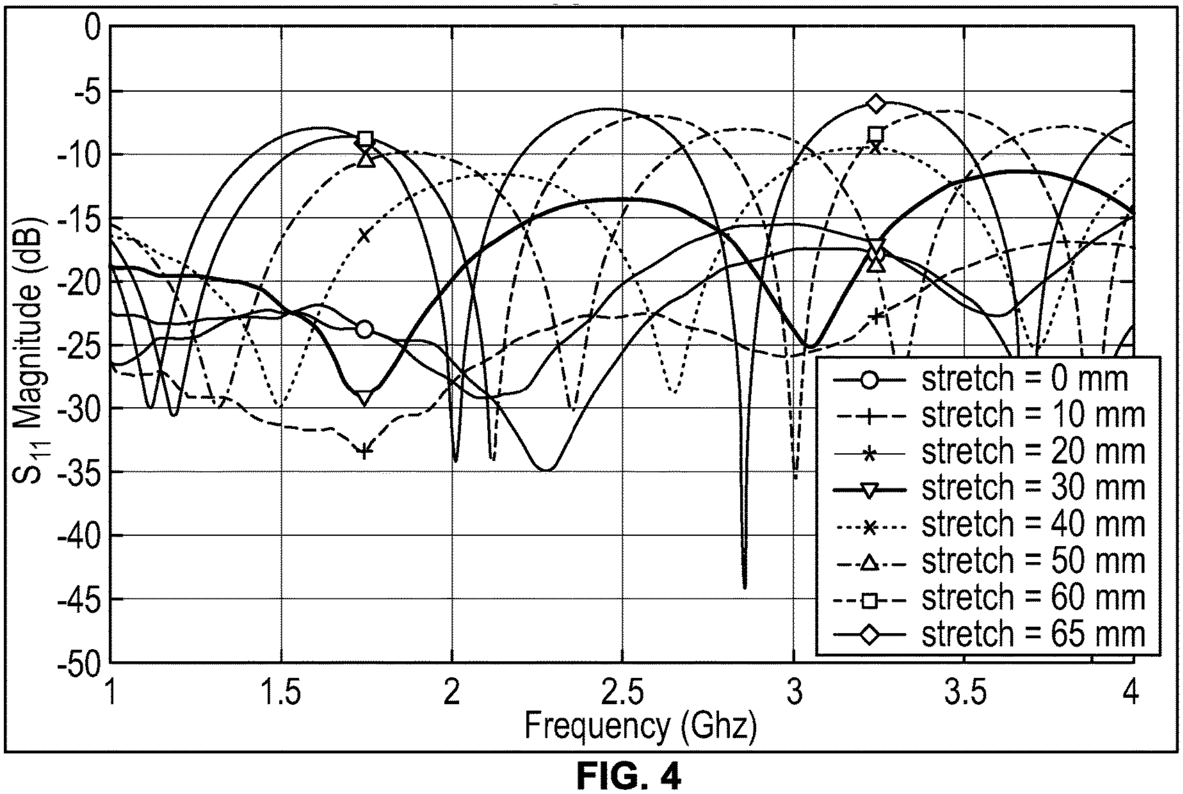
FIG. 4 illustrates the magnitude of the reflection coefficient ($S_{11}$) for the constructed phase shifter with stretches varying from 0 mm to 65 mm. A maximum stretch of about 40 mm is found to maintain an $S_{11}$ at −10 dB or better across the entire band.

From inspection of the reflection coefficient plot of FIG. 4, the maximum stretch while maintaining an $S_{11}$ better than −10 dB, over the entire frequency, is found to be roughly 40 mm or about 62%. Inspection of the transmission coefficient plot of FIG. 5, shows the maximum loss of about 1.8 dB when limited to the 40 mm stretch to maintain the $S_{11}$ at −10 dB or better. If the stretch increased to 65 mm (100% stretch), the maximum loss is still less than 2.8 dB. Lastly, the phase plot of FIG. 6 includes annotations for both phase shifts at 40 mm (S11 of −10 dB or better) and also 65 mm (100% stretch). At 2.4 GHz, a 40 mm stretch provides a phase shift of 194° and a 65 mm stretch provides a phase shift of 321° . . . This equates to about 49.4°/10 mm which roughly matches the simulated value of 51.4°/10 mm.

Other embodiments of the stretchable liquid metal coaxial phase shifter of the present invention demonstrates improvements in the high frequency response by modifying the shield from a woven mesh-style to a hollow cylinder-style. By such modifications, the reflection coefficient was improved from roughly −5 dB to −10 dB with the maximum frequency also increasing from 2.5 GHz to 4 GHz. This higher frequency of course enabled more phase shift but the high elasticity of the Ecoflex™ which allowed a greater stretch, and the improved reflection coefficient almost tripled the phase shift at 2 GHz from 74° to 203° (50 mm stretch, S11 better than −10 dB). Additionally, the transmission coefficient was improved from −2.7 dB at 2 GHz to better than −1.8 dB up to 4 GHz (40 mm stretch, S11 better than −10 dB). Additional improvements in the design and construction would likely further improve the results. Such improvements could be a) decreasing the thickness of the liquid metal shield to reduce sagging from the heavy liquid metal, b) improving the liquid metal injection technique for the shield to ensure no air gaps, and c) reducing the diameter of the phase shifter to also decrease weight and sagging.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A stretchable liquid metal coaxial phase shifter comprising: a liquid metal center conductor, said liquid metal center conductor encased within a first stretchable polymer layer which insulates said a liquid metal center conductor; a liquid metal shield, said a liquid metal shield encases said first stretchable polymer layer; a second stretchable polymer layer, said second stretchable polymer layer surrounds and encases said liquid metal shield; and wherein said phase shifter is adapted to stretch from a first length having a first phase to a second length having a second phase, said second length is longer than said first length and said first phase is different than said second phase.

2. The stretchable liquid metal coaxial phase shifter of claim 1 wherein said phase shifter is adapted to stretch from a first length to a second length, said second length is longer than said first length.

3. The stretchable liquid metal coaxial phase shifter of claim 1 further comprising disks attached to at least one of said stretchable polymer layers at the top and bottom of the phase shifter; said disks configured to function as attachment points for stretching the phase shifter, and to provide a rigid surface for attaching components to externally interface with said liquid metal center conductor.

4. The stretchable liquid metal coaxial phase shifter of claim 3 wherein said disks are metal.

5. The stretchable liquid metal coaxial phase shifter of claim 4 further comprising opposing located center pins, said center pins maintain an electrical connection with said liquid metal center conductor while moving from a first position to a second position inside said liquid metal center conductor.

6. The stretchable liquid metal coaxial phase shifter of claim 5 wherein said pins are closer together when in said first position than when in said second position.

7. The stretchable liquid metal coaxial phase shifter of claim 6 wherein said center pins extend through said disks.

8. The stretchable liquid metal coaxial phase shifter of claim 6 wherein said center pins extend through and are attached to said disks.

9. The stretchable liquid metal coaxial phase shifter of claim 6 wherein said center pins extend through and are attached to said disks by a connector.

10. The stretchable liquid metal coaxial phase shifter of claim 6 wherein said phase shifter has a 1 dB loss with 30 mm stretch.

11. The stretchable liquid metal coaxial phase shifter of claim 6 wherein said phase shifter has a 2.2 dB loss with 65 mm stretch at 2.4 GHz.

12. The stretchable liquid metal coaxial phase shifter of claim 6 wherein said phase shifter has a 2.2 dB loss with 65 mm stretch at 2.4 GHz with a 321 degree phase shift.

13. A stretchable liquid metal coaxial phase shifter comprising: a liquid metal center conductor, said liquid metal center conductor encased within a first stretchable polymer layer which insulates said a liquid metal center conductor; a liquid metal shield, said a liquid metal shield encases said first stretchable polymer layer; a second stretchable polymer layer, said second stretchable polymer layer surrounds and encases said liquid metal shield; and wherein said phase shifter is adapted to be compressed.

14. The stretchable liquid metal coaxial phase shifter of claim 13 wherein said phase shifter is adapted to be elongated.

15. The stretchable liquid metal coaxial phase shifter of claim 14 further comprising opposing located center pins, said center pins maintain an electrical connection with said liquid metal center conductor and move towards one another when said phase shifter is compressed.

16. The stretchable liquid metal coaxial phase shifter of claim 14 further comprising opposing located center pins, said center pins maintain an electrical connection with said liquid metal center conductor and move away from one another when said phase shifter is elongated.

17. The stretchable liquid metal coaxial phase shifter of claim 13 further comprising metal disks attached to at least one of said stretchable polymer layers at the top and bottom of the phase shifter; said disks configured to function as attachment points for stretching the phase shifter, and to provide a rigid surface for attaching components to externally interface with said liquid metal center conductor.

18. The stretchable liquid metal coaxial phase shifter of claim 17 wherein said center pins extend through said disks.

* * * * *